United States Patent [19]
Helfrich et al.

[11] 3,990,530
[45] Nov. 9, 1976

[54] NOISE SUPPRESSOR FOR TURBINE TYPE POWER PLANT
[75] Inventors: William Edward Helfrich, Glastonbury; Robert Bernard Cavanagh, Rockville, both of Conn.
[73] Assignee: United Technologies Corporation, Hartford, Conn.
[22] Filed: May 19, 1975
[21] Appl. No.: 578,973

[52] U.S. Cl. .................... 181/33 HC; 239/265.13
[51] Int. Cl.² .......................................... B64D 33/06
[58] Field of Search ...... 181/33 HB, 33 HC, 33 HD; 239/265.13, 265.17, 265.19, 265.25, 265.33, 265.37, 265.39, 265.41

[56] References Cited
UNITED STATES PATENTS

| | | | |
|---|---|---|---|
| 3,262,264 | 7/1966 | Gardiner et al. | 181/33 HC UX |
| 3,333,772 | 8/1967 | Bruner | 239/265.13 |
| 3,467,312 | 9/1969 | Mehr | 181/33 HC UX |
| 3,524,588 | 8/1970 | Duval | 181/33 HC X |
| 3,613,996 | 10/1971 | Tanner | 239/265.13 |
| 3,696,617 | 10/1972 | Ellis | 181/33 HC X |

Primary Examiner—John Gonzales
Attorney, Agent, or Firm—Norman Friedland

[57] ABSTRACT

A combined ejector and retractable suppressor to suppress jet noise occasioned by the hot gases discharging from the tail pipe of a gas turbine engine has a generally conical shaped duct member defining a primary nozzle coaxially mounted within the ejector and radially spaced therefrom for defining therewith a secondary flow passage, which member carries a plurality of circumferentially spaced flaps overlying complementary apertures for admitting hot gases passing from the tail pipe of the engine into the secondary flow passage to mix with the secondary air before discharging through the exit nozzle. These apertures are judiciously located relative to the ejector so that the hot gases in the duct are admitted at the entrance of the ejector and the flaps are dimensioned to achieve optimum air mixture. A fairing on the flaps extending in the inner diameter of the duct member serves to reduce thrust losses.

14 Claims, 7 Drawing Figures

2

NOISE SUPPRESSOR FOR TURBINE TYPE POWER PLANT

BACKGROUND OF THE INVENTION

This invention relates to aircraft turbojet and turbofan engines and particularly to means for suppressing jet noise occasioned by the hot gases discharging from the tail pipe.

As is well known the exhaust gases discharging from the tail pipe of a gas turbine type power plant, particularly during the take-off regime, has been a source of unwanted jet noise caused by the mixing of the high velocity exhaust gases with the surrounding ambient air. Many types of suppressors have been developed to reduce this jet noise, but most have economic disadvantages. Fixed geometry suppressors can provide some noise reduction at take-off, but they invariably cause a loss of thrust at cruise, thereby increasing fuel consumption over the entire operating range of the engine. Variable geometry suppressor designs shown in the literature are generally too complex, leading to high initial cost and questionable reliability.

This invention contemplates a solution to the same problem but does so in a less complex and hence simpler, less costly manner. A single set of retractable flaps mounted in a particular location from where is heretofore shown, serves as an effective way of reducing noise. I have found that by using an ejector in combination with retractable flaps and judiciously locating the flaps relative to the ejector and providing effective mixing between the engine exhaust gases and the ejector secondary flow, a reduced velocity at the ejector exit will be realized resulting in reduced jet noise.

Additionally, loss of engine thrust during deployment of the flaps can be minimized by fairing the flaps on the downstream side to reduce their drag. In configurations utilizing flaps that pivot radially outward with respect to the tail pipe axis, this invention contemplates the use of an axially moveable plug centrally mounted which forms an annular nozzle in conjunction with the tail pipe exit. This variable area nozzle permits the suppressor to be utilized at various engine conditions other than full take-off thrust with the engine correctly matched via the proper discharge area. For a simpler device which would operate only at full take-off thrust, the moveable plug can be positioned axially for correct enging match and fixed at that location. This would eliminate adjusting the individual flap positions and/or size of the tail pipe openings when the suppressor is installed on the engine.

SUMMARY OF THE INVENTION

An object of this invention is to provide an improved combined ejector/suppressor for an aircraft turbojet or turbofan engine.

A still further object is to provide for a combined ejector and suppressor a plurality of flaps adapted to direct hot exhaust gases from the engine tail pipe into the inlet end of an ejector during take-off regime of the aircraft, and being characterized as simple to manufacture and install, less expensive than heretofore known types, and retractable to minimize thrust loss in the aircraft cruise regime.

Other features and advantages will be apparent from the specification and claims and from the accompanying drawings which illustrate an embodiment of the invention.

DESCRIPTION OF THE PREFERRED EMBODIMENT

As will be appreciated by one skilled in this art, the ejector can be utilized with a variety of turbine types of power plants, as for example a turbojet, a turbofan where the fan discharges into a common tail pipe, and variable stream SST type engines. The particular schematic illustrative of the tail pipe should not be construed as a limitation of the type of power plant.

Figure 1:
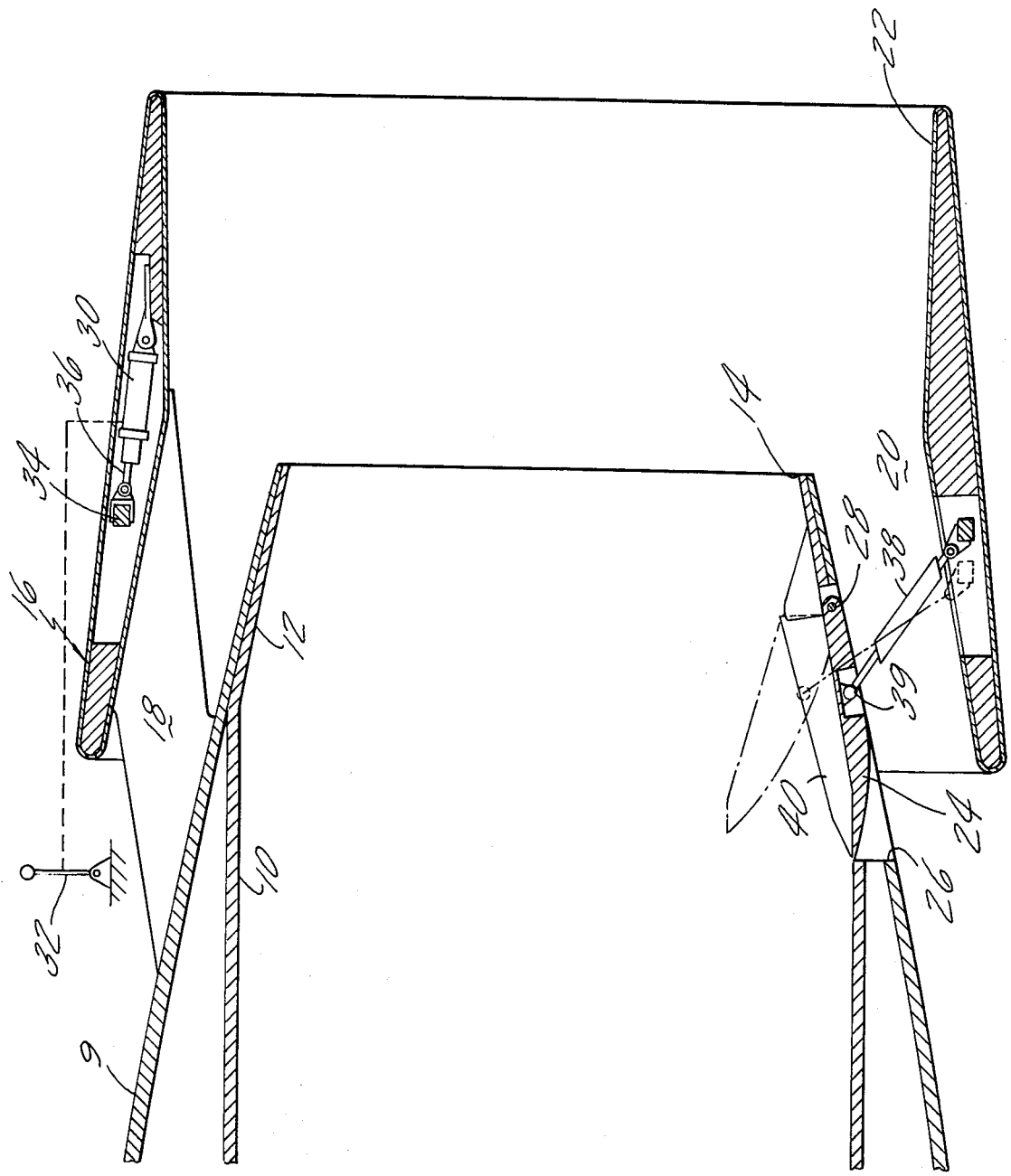
FIG. 1 is a view partly in section and partly in schematic illustrating the invention.

The invention can best be understood by referring to FIG. 1 which shows engine tail pipe 10 which has a conically shaped portion 12 terminating in a primary nozzle 14, and also shows aircraft nacelle 9. Ejector 16, supported coaxially with respect to nacelle 9 by struts 18 (one being shown) is dimensioned and spaced to form annular passage 20 through which secondary air flow is induced by the hot gases egressing from the tail pipe via primary nozzle 14, to discharge through the ejector exit 22. As shown, ejector 16 is fixed, but may be translated axially if desired. So long as the geometry of the ejector does not adversely affect the aircraft or engine performance during those operating regimes where it is not needed, it can be designed to be fixed. Otherwise it may be designed to be stowed, as by translating it forward, so that the tail pipe will exit directly to ambient. Translating ejectors are well known and are not considered a part of this inventive concept.

In accordance with this invention, a plurality of flaps (one being shown) cooperating with a corresponding number of apertures 26, circumferentially spaced in element 12, is pivotally mounted in any well known manner, as by pin 28 to be positioned radially inward at a predetermined angle to the tail pipe axis to direct a portion of the hot exhaust gases in tail pipe 10 to bypass primary nozzle 14 and enter into passage 20 to mix with the ambient air flowing therein. As shown, flaps 24 may be positioned by any well known actuator, as for example actuator 30 which is mounted in a recess formed in ejector 16. Actuator 30, which may respond to any signal indicative of aircraft take-off thrust, is shown schematically to respond to the position of power lever 32 which is normally mounted in the cockpit. Synchronizing ring 34 is suitably attached to the actuator piston rod 36 which in turn is connected to connecting rod 38. End 39 of piston 38 is suitably pinned to flap 24 so that rectilinear movement of rod 36 will cause flap 24 to move inwardly toward the axis of the tail pipe and open aperture 26 as shown in phantom. Obviously, each flap will have an identical connecting rod 38 and only one is shown for the sake of convenience.

So as to minimize engine thrust losses during deployment of the flaps the inner side of flap 38, that is the surface exposed to the hot gases in the tail pipe, carries a fairing 40 formed by sheet metal suitably attached to the main body of flap 24. The fairing preferably is shaped so as to provide minimum flow separation of the exhaust gases which flow past the flaps and through primary nozzle 14. Since the optimum flap angle for minimum jet noise will probably be 15° to 20° from the tail pipe axis, the fairing can be short and still provide a streamlined shape to the flow past the flap.

Figure 2:
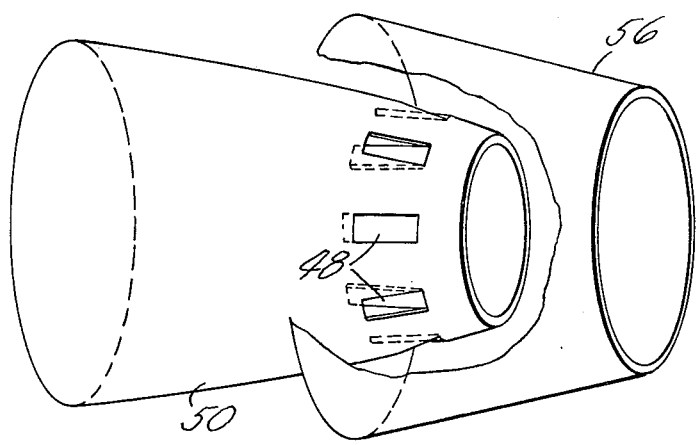
FIG. 2 is a perspective partial view illustrating rearwardly pivoted flaps and an ejector.
Figure 3:
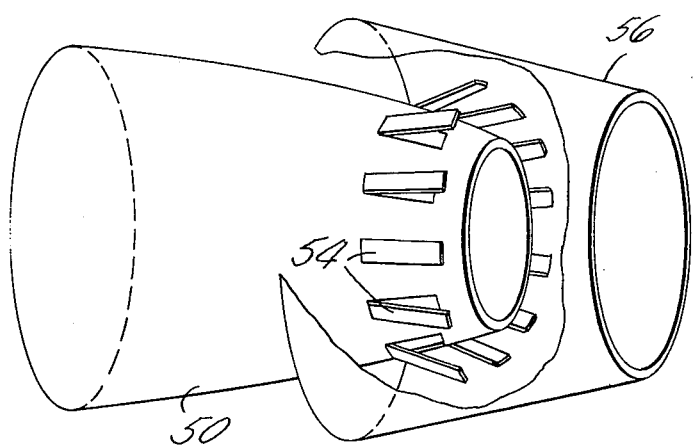
FIG. 3 is a perspective partial view illustrating front pivoted flaps and an ejector.
Figure 4:
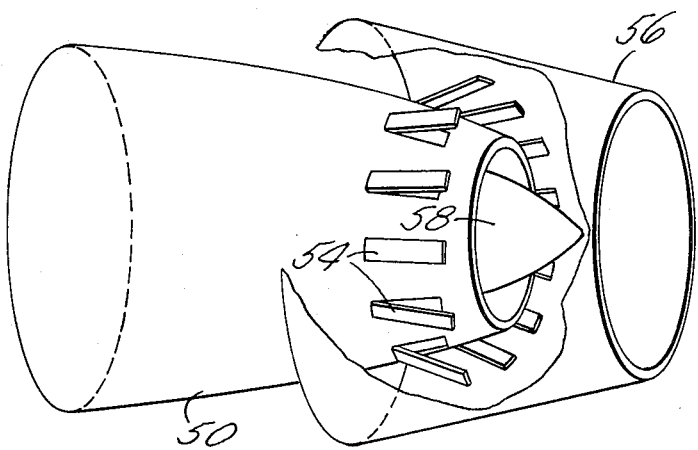
FIG. 4 is a perspective partial view illustrating front pivoted flaps with a plug and ejector.
Figure 5:
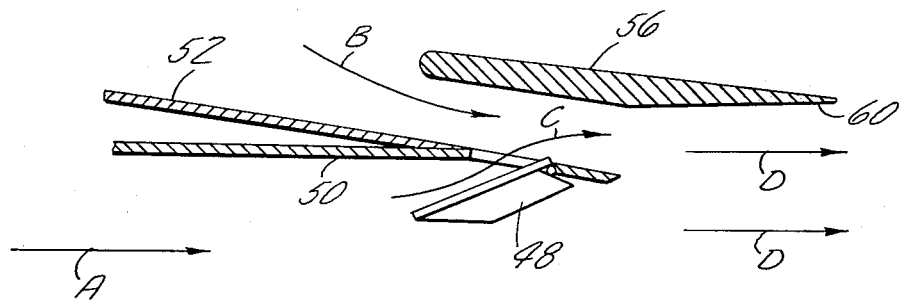
FIG. 5 is a partial sectional and schematic view showing the flow path of the ejector suppressor with the rear pivoted flap.
Figure 6:
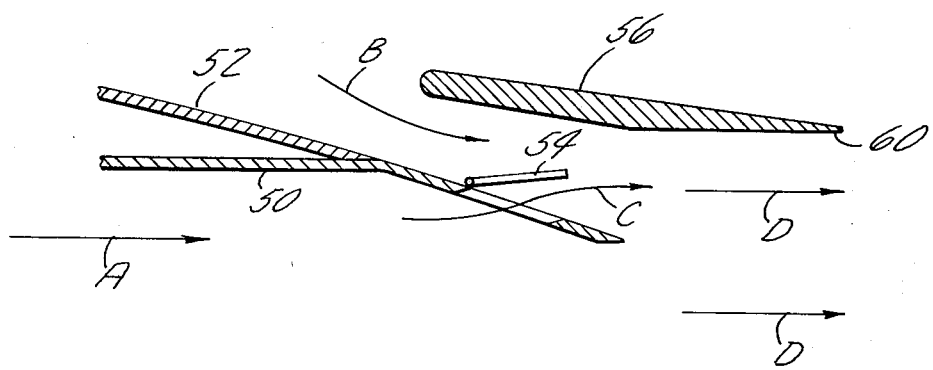
FIG. 6 is a partial sectional schematic view showing the flow path of the ejector suppressor with the front pivoted flap.
Figure 7:
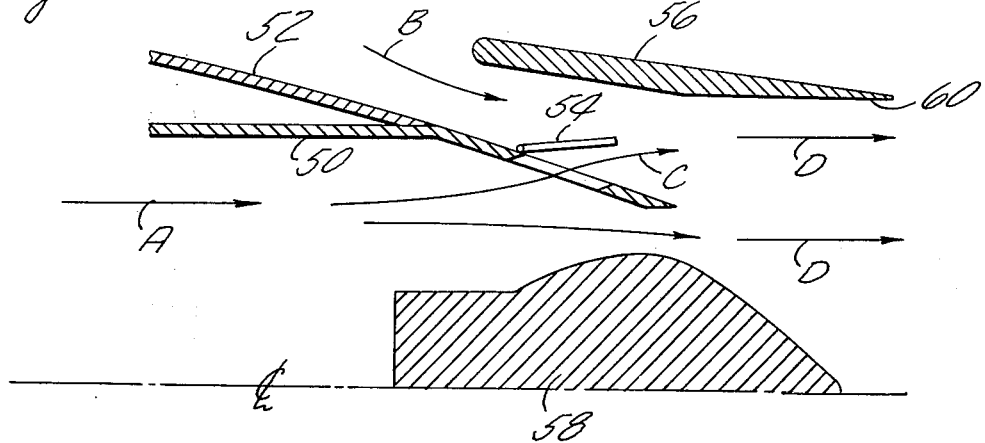
FIG. 7 is a partial sectional and schematic view showing the flow path of the ejector-suppressor with the front pivoted flaps where a plug is utilized.

FIGS. 2–7 (inclusive) show different flap configurations which are contemplated as part of this invention. FIGS. 2 and 5 show a rear pivot flap 48 mounted in the tail pipe 50 which is shown in relation to nacelle 52. FIGS. 3 and 6 show a front pivot flap 54 which pivots toward the ejector 56. The configuration in FIGS. 4 and 7 is similar to the one shown in FIGS. 3 and 6, but includes an axially moveable plug 58 centrally mounted in the tail pipe 50.

As shown in FIGS. 2–7, the flow path through the tail pipe is represented by arrow A. The secondary flow through the ejector is represented by arrow B, the flow through the flap apertures is represented by arrow C, and all the flow ultimately discharges overboard via the ejector exit 60. It will be apparent from the foregoing that when the flaps are opened during take-off that a portion of hot gases in the tail pipe is bled through the flap apertures to mix with the secondary flow in the ejector, and in each instance the exhaust gas is admitted near the inlet of ejector 56 and at an angle which will produce optimum mixing of the tail pipe gas and the ejector flow. This mixing will serve to achieve a more uniform velocity of all the flow as represented by the velocity vector D at the ejector exit 60. The mixed average velocity will be less than the velocity of the exhaust gases without this invention attached to the engine, and jet noise will be reduced accordingly.

It will be noted that the flaps 48 of FIG. 5 and flaps 24 of FIG. 1 must be so constructed that when the flaps are extended radially inward, the flow area between the flaps is greater than the primary nozzle area. Since the amount of exhaust gases passing through the primary nozzle is reduced by the amount flowing out through aperture 26, the primary nozzle area must be reduced from that of the standard engine. The same is true for the configurations shown in FIGS. 6 and 7.

What has been shown by this invention is a combined ejector suppressor comprising annularly shaped coaxially mounted elements, spaced to define the primary and secondary flows. Flaps, circumferentially spaced, open apertures to permit hot exhaust gases from the engine tail pipe to flow into the ejector secondary passage at an optimum angle to obtain mixing of the exhaust gases with ambient ejector flow. This serves to provide an efficacious noise suppressor and is characterized as being simple and economical to manufacture without sacrificing excessive reduction in thrust.

It should be understood that the invention is not limited to the particular embodiments shown and described herein, but that various changes and modifications may be made without departing from the spirit or scope of this novel concept as defined by the following claims.

We claim:

1. For aircraft, a turbine type power plant having a tail pipe exhausting hot gases emanating from within said power plant, means for suppressing the noise of the exhausting hot gases including an ejector having a conical body supported adjacent to the end of said tail pipe, a conical hollow member defining a primary nozzle projecting into said conical body concentrically mounted and radially spaced relative to said ejector and extending from the end of said tail pipe and defining with said ejector a flow passage, said ejector having an annular inlet disposed in proximity to the inlet of the conical hollow member, normally closed retractable flap means circumferentially disposed about said conical member and having a moveable plate-like element overlying openings disposed in a plane that includes said inlet of said ejector to admit said exhaust gases near said annular inlet of said flow passage and means for moving said flaps to the open position during the take-off regime of the aircraft, whereby said hot gases in said tail pipe bypasses said primary nozzle, mixes with the air in said flow passage and discharges through said ejector.

2. For aircraft, as claimed in claim 1 including an actuator attached to said conical body of said ejector, said flap means including a plurality of circumferentially spaced flap elements and means interconnecting said actuator and each of said flap elements to deploy them synchronously.

3. For aircraft as claimed in claim 2 including means for pivotally mounting said flap means at its rear end relative to said hot gas stream.

4. For aircraft as claimed in claim 3 wherein said flap means is pivotable inwardly relative to the axis of said conical hollow member.

5. For aircraft as claimed in claim 4 including a facing mounted on the inner face of said flap means extending inwardly relative to said axis and defining an aerodynamically shaped inner body portion.

6. For aircraft as claimed in claim 1 including pivot means rotably supporting said flap and means for urging said flap away from said opening into said secondary flow passage.

7. For aircraft as claimed in claim 6 wherein said pivot is mounted at the forward end of said flap means relative to the hot gaseous flow.

8. For aircraft as claimed in claim 6 including a central plug-like member mounted in said conical member for defining the area of said primary nozzle.

9. For aircraft as claimed in claim 1 wherein said flap means extend substantially 15° to 20° with respect to the axis of said tail pipe when in the opened position.

10. Means for suppressing the noise of the exhausting hot gases emanating from a turbine type power plant powering aircraft from the tail pipe, including conically shaped ejector means supported adjacent to the end of said tail pipe, a conical duct defining a primary nozzle surrounded by and radially spaced relative to said ejector means attached to the end of said tail pipe, and defining with said ejector means a flow passage, said ejector means having an annular inlet for ambient air disposed upstream of said end of said conical duct relative to the direction of flow of said hot gases, retractable flap means circumferentially disposed about said conical duct overlying openings in said conical duct and being disposed in a plane that includes said annular inlet to admit said exhaust gases into said annular inlet of said flow passage and mix with said ambient air and means for extending said flap means to the open position during the take-off regime of the aircraft.

11. Means as claimed in claim 10 including pivot means mounted transverse to the axis of said duct at the rear end of said flap means for pivoting said flap means in said primary nozzle.

12. Means as claimed in claim 10 including pivot means mounted transverse to the axis of said duct at the forward end of said flap means for pivoting said flap means in said secondary flow passage.

13. Means as claimed in claim 12 including a central plug member in said conical duct moveable axially relative to said primary nozzle to change the area thereof.

14. Means as in claim 10 wherein said flap means extend substantially 15° to 20° with respect to the axis of said tail pipe when in the opened position.

* * * * *